3,370,353
WIRE CUTTING TOOL
Bernard Weissman, 304 Ashland Place, Brooklyn, N.Y. 11217, and Joseph P. Moffa, Indianapolis, Ind.; said Moffa assignor to said Weissman
Filed Apr. 8, 1966, Ser. No. 541,330
7 Claims. (Cl. 30—233)

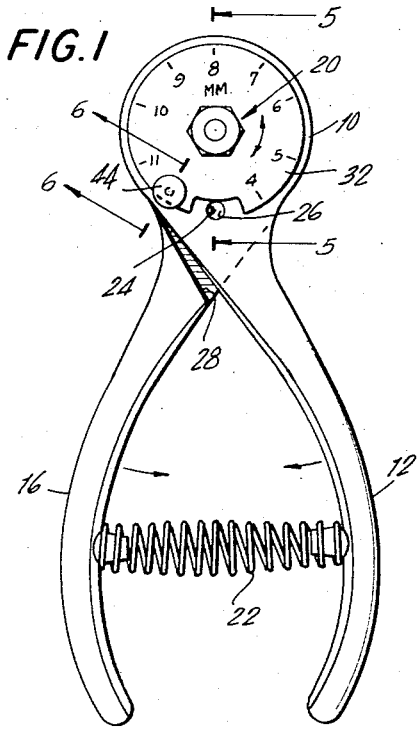
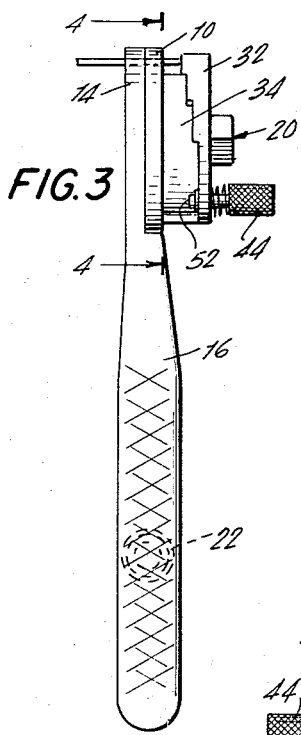
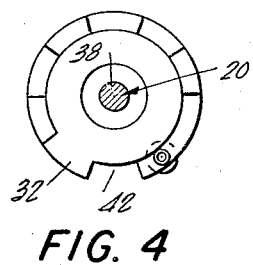
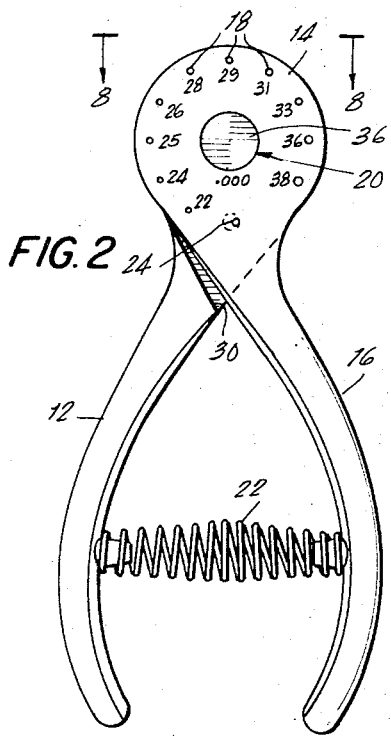
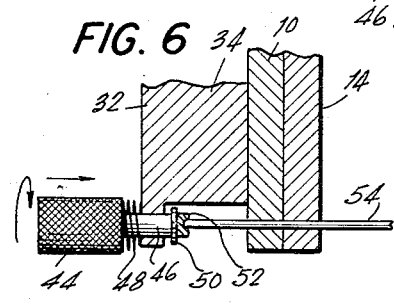
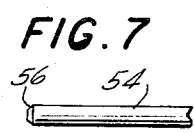
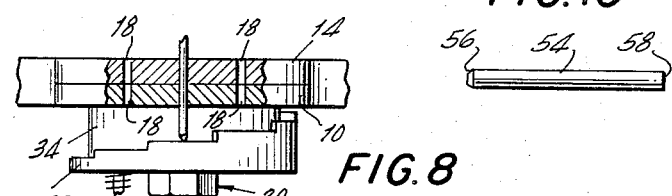
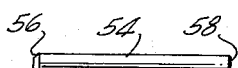
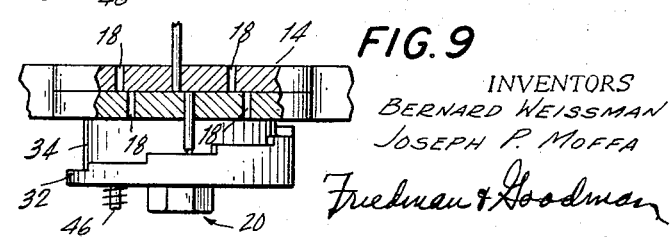
INVENTORS
BERNARD WEISSMAN
JOSEPH P. MOFFA
Friedman & Goodman
ATTORNEYS

United States Patent Office 3,370,353
Patented Feb. 27, 1968

ABSTRACT OF THE DISCLOSURE

A precision measuring wire cutter embodying a first shearing plate having apertures of various diameters, a second shearing plate having apertures similar in size and position to said apertures, means for relatively moving the plates and means in the form of a stepped plate for limiting the forward travel of a workpiece inserted through the apertures when they are in registry, the stepped plate being movable relative to the shearing plates to bring any of the steps of said stepped plate selectively into registry with any of a plurality of apertures of various diameters.

---

Many forms of cutting tool for wire, rivets, bolts and the like have heretofore been proposed. The usual forms of wire cutter provide no means for accurately measuring short lengths of wire, and are of little help in cutting accurately measured short lengths of wire for applications such as those mentioned above.

Certain tools have been proposed in the past, which are provided with means for controlling the length of the portion to be cut off, for example, in cutting rivets to controlled lengths for use in aircraft assembly operations and the like. One type of such tool is provided with a stepped block to provide for various lengths of rivet, cooperating with an array of apertures over each level of the stepped block, to provide for the cutting of various diameters of rivet to whatever length is predetermined by the height of a particular step of the block. Such a tool is useful in cases where the number of workpiece diameters, and the number of cut lengths involved, are both relatively small. Such a tool may, for example, cut a rivet of any of, say, three diameters, to any of, for example, five selected lengths. Tools of this type are useful for the purposes for which they are intended, but lack the fllexibility required where it is necessary to provide for a relatively large selection of workpiece diameters and a relatively large selection of cut lengths as is necessary, for example, in the cutting of small, precisely-measured lengths of wire for use in orthodontal surgery.

Another type of cutter comprises a pair of apertured shearing plates and means, such as gauge plates or the like, adapted to engage and hold the head of a rivet or the like at a predetermined distance away from the plane of contact between the shearing plates, thus determining the cut length of the rivet. Apparatus of this type, however, is operable only when the workpiece has an enlarged portion at one end, such as the head of a rivet, and thus cannot be used to control the length of a cut piece of wire of uniform diameter.

The character of the cut end of the wire depends upon the type of cutter used. When the cutter is of the type commonly used by electricians, for example, the cutting action is exerted by a pair of opposed cutting edges which are forced together from opposite sides of the wire. This type of cutter leaves a wedge-shaped end, having a transverse projecting edge across the cut end of the wire. This is undesirable when the wire is to be used for dental surgery or the like.

Another type of cutter is provided with a pair of apertured shearing plates held together in sliding, face to face contact, and means for moving the aperture or apertures in one plate into and out of registry with the aperture or apertures of the other. The workpiece is inserted through the registered apertures, and the shearing plates are moved relatively to each other, thereby taking the apertures out of registry and shearing the workpiece. Such a tool produces a "square" cut end—i.e. one which is bounded by a plane face normal to the longitudinal axis of the workpiece. The cut end of the workpiece, in this case, does not have the projecting transverse edge produced by the electrician's type of wire-cutter, but it does have a sharp circumferential edge where the side walls of the workpiece intersect with the cut end. In addition, particularly when the edges of the apertures are not sharp, or the tool has become loose so that the cutting plates are not held in close, positive contact, there may be produced a projecting burr extending outwardly from the circumferential edge. Both of these conditions—i.e. the sharp circumferential edge and the projecting burr—are undesirable for the purpose of use in dental work and for other purposes. Such sharp edges and burrs may be and usually are removed by filling, or by twirling the cut end against an abrasive such as fine emery cloth or the like, but this requires additional manipulation and the use of additional tools.

An object of this invention, therefore, is to provide an improved tool for cutting wire and the like.

Another object is to provide a tool of the type described, which is capable of accommodating a wide variety of workpiece diameters, cut lengths, and permutations thereof.

Still another object is to provide a cutting tool adapted to cut short, precisely-measured lengths of uniform-diameter material such as wire or the like.

A further object is to provide a cutting tool adapted to produce a "square" cut end, devoid of transverse projecting edges.

Another object is to provide a tool provided with means for removing sharp circumferential edges and burrs from the cut end of the wire.

A feature of the invention is the use of a pair of apertured shearing plates, each of the plates being provided with a plurality of apertures of various diameters, and means for relatively moving the plates so as to bring the apertures into and out of registry with one another.

Another feature is the use of a stepped plate, so mounted that each of the various steps thereof can be registered selectively with any of the apertures of the shearing plates.

A further feature is the use of locating means for limiting the relative motion of said shearing plates in one direction to a position in which the apertures of one plate are registered with the apertures of the other.

Still another feature is the provision of spring means for urging said plates to a relative position in which said apertures are registered.

Yet another feature is the provision of means for relatively moving said plates in a second direction against the urging of said spring to a position in which the apertures of one plate are out of registry with the apertures of the other.

Another feature is the provision of limiting means for restricting the relative motion of said plates in said second direction.

A further feature is the provision of abrasive deburring means associated with said tool.

According to another feature of the invention the deburring means is movable selectively to register with any of the pairs of apertures in the cutting plates.

Other objects, features and advantages of the invention will become apparent from the following more complete description and claims, and the accompanying drawings.

In one particularly desirable embodiment, this invention contemplates a wire-cutting tool comprising in combination a first shearing plate having apertures of various diameters, a second sheet having apertures similiar in size and position to the apertures of said first plate, means for relatively moving said plates, means for limiting the relative motion of said plates in one direction to a position in which said apertures of said first plate are in registry with the apertures of said second plate, means in the form of a stepped plate for limiting the forward travel of a workpiece inserted through said apertures when said apertures are in registry, said stepped plate being movable relative to said shearing plates in such manner as to bring any of the steps of said stepped plate selectively into registry with any of a plurality of said apertures.

Referring now to the drawings:

FIGURE 1 is a rear view of a wire-cutting tool according to the invention.

FIGURE 2 is a front view of the tool of FIGURE 1.

FIGURE 3 is a side elevation of the tool of FIGURES 1 and 2.

FIGURE 4 is a front view of the stepped plate, taken along line 4—4 of FIGURE 3.

FIGURE 5 is a central cross-section of the head of the tool, taken along line 5—5 of FIGURE 1, on a somewhat larger scale.

FIGURE 6 is a fragmentary sectional view taken along line 6—6 of FIGURE 1, showing certain details of the deburring member of the tool.

FIGURE 7 is a fragmentary view showing the end of a wire workpiece as it is shaped by a deburring tool according to one embodiment of the invention.

FIGURE 8 is a top view, partly in section, with some parts broken away to show the internal disposition of the parts, taken along line 8—8 of FIGURE 2, and showing the disposition of the parts just prior to cutting a length of wire.

FIGURE 9 is a top view, similar to FIGURE 8, showing the disposition of the parts just after the shearing plates have been moved relative to each other to shear off a measured length of wire.

FIGURE 10 is a view similar to FIGURE 7, showing, on an enlarged scale, a length of wire such as may be produced by the use of the tool according to the invention.

Referring now more particularly to FIGURES 1 and 2, the tool according to the embodiment there illustrated comprises a first shearing plate 10 provided with an integral extension forming handle 12 and a second shearing plate 14 provided with an integral extension forming handle 16. Each of the two shearing plates is provided with a series of apertures 18 of various diameters, those in plate 14 being visible in FIGURE 2.

The two shearing plates are held in close face-to-face contact by a pivotal connection indicated generally at 20, and the handles of the plates are urged apart by a suitable spring 22, tending to rotate plate 10 counterclockwise and plate 14 clockwise, as viewed from the rear in FIGURE 1. The extent of this relative motion is limited by suitable means such as pin 24, projecting from plate 14, and orifice 26 in plate 10, which forms an abutment for pin 24 and prevents the relative motion produced by spring 22 from proceeding beyond the position illustrated in the drawings, wherein the apertures 18 of the plate 14 are in registry with those of plate 10 (as better shown in FIGURE 8, for example).

The plates are relatively movable about pivot 20 in the opposite direction, against the bias of spring 22, by manual compressive pressure on handles 12 and 16, moving them toward each other as indicated by the arrows (FIG. 1). The effect of this motion is to move the apertures in the plates out of alignment, thereby shearing any wire that has been inserted through the aligned apertures, as illustrated in FIGURE 9. The extent of motion in this direction may be limited by pin 24 striking the opposite side of aperture 26 (i.e. the right side thereof, as seen in FIGURE 1), but is preferably limited by means capable of withstanding considerable overpressure, for example, by providing a shoulder 28 on handle 16, against which the adjacent portion of handle 12 may abut, thereby preventing further relative motion. A similar shoulder 30 may be provided on the opposite side of handle 12, against which the adjacent portion of handle 16 may abut. Provision of means such as shoulders 28 and 30 to arrest the relative motion of the shearing plates has the advantage of avoiding any possible deformation of pin 24 by the forces generated when a wire parts under a strong applied shearing force.

The length of the portion of wire cut off is controlled by the use of stepped plate 32. Plate 32 is mounted behind shearing plate 10, spaced therefrom by suitable spacing means such as drum 34 which may be a separate member or may, as illustrated, be an integral part of stepped plate 32. Drum 34 and stepped plate 32 are connected to shearing plates 10 and 14 by pivotal connection 20 which may, as illustrated in FIGURE 5, comprise a compression bushing 36 to hold the shearing plates in close sliding contact, and a shaft 38 extending through drum 34 and stepped plate 32, and terminating in a threaded end engaging a nut 40 which holds the whole together. Stepped plate 32 is mounted to rotate freely about shaft 38 (with or without drum 34), so that any of the steps can be brought into position behind any of the apertures as may be desired. Stepped plate 32 is preferably interrupted by an open area 42. When open area 42 is positioned behind a given pair of apertures, the wire may be passed through the apertures to any desired extent, so that longer lengths of wire, exceeding the measuring capacity of the tool, may be cut as desired. Rotation of plate 32 about shaft 38 is facilitated by the provision of a projecting handle 44. Handle 44, in the preferred embodiment illustrated, also serves another purpose, presently to be described.

In many, if not most dental operations involving the use of wire, it is desirable that at least one end of the wire to be used have a chamfered or rounded end, devoid of sharp edges or burrs. In the present invention, as illustrated, this result is achieved by the use of a self-contained deburring tool, comprising handle 44 connected to a shaft 46 journaled into a suitable aperture in stepped plate 32, radially equidistant from the pivotal connection 20 with apertures 18. Shaft 46 is preferably left free to move axially within its aperture, being urged outwardly by spring 48 against a suitable stop such as flange 50. The internal end of shaft 46 is provided with a concave abrasive member 52. To deburr the end of a wire prior to cutting, the wire 54 is inserted through a suitable pair of registered apertures (corresponding to the diameter of the wire), the stepped plate 32 is rotated to a position such that the deburring tool is aligned with the end of the wire, and the deburring tool is pushed in against the wire and twirled by means of handle 44, leaving the end of the wire with a rounded or chamfered shape, as illustrated in FIGURE 7.

The wire is then partially withdrawn, if necessary, and the stepped plate again rotated until the appropriate step is positioned in alignment with the end of the wire so as to provide the required cut length. The lengths corresponding to the various steps are preferably indicated by suitable indicia on the rear face of the stepped plate 32, as indicated in FIGURE 1. The wire is then pushed through the aligned apertures until it abuts the selected step, as shown in FIGURE 8, and the handles are compressed, moving the apertures out of registry and shearing off the end portion of the wire, as shown in FIGURE 9. The resulting cut portion has one rounded or chamfered end 56 and one "square" end 58, as shown in FIGURE 10. If desired, the "square" end may also be deburred or rounded in the conventional manner. This is frequently unnecessary, however, as one end of the wire is commonly embedded in cement or other non-sensitive material, and the need for providing a deburred end to avoid tissue damage exists only at one end of the wire.

It is to be noted that the tool according to the present invention provides great flexibility in the selection of wire diameter and length. For example, in the embodiment illustrated in the drawings, there are provided apertures for ten different wire diameters and steps on the stepped plate for the production of eight different lengths. All of the lengths may be produced from any of the diameters, providing a total of eighty diameter-length combinations, in addition to the possibility of cutting indefinite lengths from any diameter of wire.

The operation of the invention is considered to be obvious from the foregoing description, but may be stated briefly as follows. Assuming that it is desired to cut, for example, a 10-mm. length of 25-mil. wire, the end of a piece of 25-mil. wire is inserted through the appropriate apertures in the shearing plates, as indicated by the indicia on the face of plate 14 (FIGURE 2). Handle 44 is manipulated to bring the deburring tool around to the end of the wire, and pushed in and twirled to deburr the end of the wire. Handle 44 is then again manipulated to bring the 10-mm. step of the stepped plate opposite the end of the wire, and the wire pushed in until it abuts the step. The handles are squeezed to shear off the end portion of wire (FIGURE 9). The handle 44 is then again manipulated to bring the open portion 42 opposite the severed end of the wire, and the latter is withdrawn in any convenient manner, for example by the use of forceps or the like, ready for use.

While this invention has been described with reference to certain preferred embodiments and illustrated by way of certain drawings, these are illustrative only, as many alternatives and equivalents will readily occur to those skilled in the art, without departing from the spirit or proper scope of the invention. The invention is therefore not to be construed as limited, except as set forth in the appended claims.

We claim:

1. A wire-cutting tool comprising in combination a first shearing plate having apertures of various diameters, a second shearing plate having apertures similar in size and position to the apertures of said first plate, means for relatively moving said plates, means for limiting the relative motion of said plates in one direction to a position in which said apertures of said first plate are in registry with the apertures of said second plate, means in the form of a stepped plate having steps spaced at varying distances laterally from said plates for limiting the forward travel of a workpiece inserted through said apertures when said apertures are in registry, said stepped plate being movable relative to said shearing plates in such manner as to bring any of the steps of said stepped plate selectively into registry with any of a plurality of said apertures of various diameters.

2. A wire-cutting tool according to claim 1, wherein said first and second shearing plates are united by a pivotal connection.

3. A wire-cutting tool according to claim 1, wherein said stepped plate is pivotally joined to said shearing plates, and is rotatable relative to said shearing plates so as to bring selected steps of said plate into registry with selected apertures of said shearing plates.

4. A wire-cutting tool according to claim 1, further comprising elongated handle means connected to each of said shearing plates, resilient means for urging said handles apart, thereby producing relative motion between said shearing plates, and limiting means for arresting said relative motion when the apertures of one of said shearing plates are in registry with the apertures of the other of said plates.

5. A wire-cutting tool according to claim 1, wherein said stepped plate is provided with a deburring tool so positioned on said stepped plate as to be adapted to be brought into registry selectively with any of the apertures of said shearing plates.

6. A wire-cutting tool according to claim 5, wherein said deburring tool comprises a shaft journaled into said stepped plate and free to move rotationally and axially therein, a handle attached to said shaft exteriorly of said stepped plate, means for retaining said shaft in said stepped plate, and a concave abrasive element attached to the end of said shaft interiorly of said stepped plate.

7. A cutting tool according to claim 1, wherein said stepped plate is provided with an open area registrable selectively with any of the apertures of said shearing plates, said open area providing for the cutting of unmeasured lengths of wire, and for the removal of lengths of wire from said tool after cutting.

References Cited

UNITED STATES PATENTS

| 13,570 | 9/1855 | Grover | 30—226 |
| 401,308 | 4/1889 | Selleck | 30—233 X |
| 2,494,996 | 1/1950 | Geddes | 30—226 |
| 2,527,735 | 10/1950 | Johnson | 30—226 |

OTHELL M. SIMPSON, *Primary Examiner.*

J. C. PETERS, *Assistant Examiner.*